US008458957B2

(12) United States Patent
Guzzi-Nicolia

(10) Patent No.: US 8,458,957 B2
(45) Date of Patent: Jun. 11, 2013

(54) SLIDING POCKET DOOR SYSTEM

(75) Inventor: Constance Guzzi-Nicolia, East Islip, NY (US)

(73) Assignee: Glidewell Track, Inc., East Islip, NY (US)

( * ) Notice: Subject to any disclaimer, the term of this patent is extended or adjusted under 35 U.S.C. 154(b) by 358 days.

(21) Appl. No.: 12/383,342

(22) Filed: Mar. 23, 2009

(65) Prior Publication Data

US 2010/0236152 A1 Sep. 23, 2010

(51) Int. Cl.

| | |
|---|---|
| ***E05D 13/00*** | (2006.01) |
| ***E05D 15/06*** | (2006.01) |
| ***E05D 15/16*** | (2006.01) |
| ***B60J 1/16*** | (2006.01) |
| ***E05F 11/38*** | (2006.01) |

(52) U.S. Cl.
USPC .............................................. 49/410; 49/372

(58) Field of Classification Search
USPC .................................................. 49/410, 411
See application file for complete search history.

(56) References Cited

U.S. PATENT DOCUMENTS

| | | | | |
|---|---|---|---|---|
| 682,338 | A * | 9/1901 | O'brien, Jr. | 49/411 |
| 1,352,100 | A | 9/1920 | Surprise | |
| 2,027,820 | A * | 1/1936 | Greiser | 101/288 |
| 2,865,043 | A * | 12/1958 | Cox | 16/90 |
| 3,100,916 | A * | 8/1963 | McKinney | 49/125 |
| 5,351,442 | A * | 10/1994 | Gingras | 49/411 |
| 5,422,552 | A * | 6/1995 | Parisi | 318/466 |
| 5,483,769 | A | 1/1996 | Zwelli | |
| 7,350,332 | B2 | 4/2008 | Petridis | |
| 7,441,726 | B2 | 10/2008 | Melberg | |
| 2006/0145007 | A1* | 7/2006 | Melberg et al. | 244/118.5 |
| 2008/0006594 | A1* | 1/2008 | Layton | 211/162 |
| 2008/0271392 | A1 | 11/2008 | Rapson | |
| 2009/0056228 | A1 | 3/2009 | Picchio | |

* cited by examiner

*Primary Examiner* — Katherine Mitchell
*Assistant Examiner* — Jeremy Ramsey
(74) *Attorney, Agent, or Firm* — Alfred M. Walker; John F. Vodopia

(57) ABSTRACT

A pocket door system with a constant rail system provides a pocket door adapted for sliding into and out of an enclosed wall pocket to enable or prevent egress through a framed door opening. The pocket door includes a roller mechanism mounted at a top surface and a slotted lower guide mechanism mounted at a bottom surface. A floor track with a vertically extending, flat, planar protruding plate element is mounted upon a floor surface is secluded within the enclosed wall pocket. The vertically extending, flat, planar protruding plate element is insertable into the corresponding vertically extending flat, planar slot of the guide mechanism. The roller mechanism of the pocket door system engages an upper track as the lower guide mechanism engages with the protruding element guide wherein the pocket door slides into and out of the enclosed wall pocket without wobbling and dislocating from the tracks during use.

17 Claims, 3 Drawing Sheets

Fig. 3
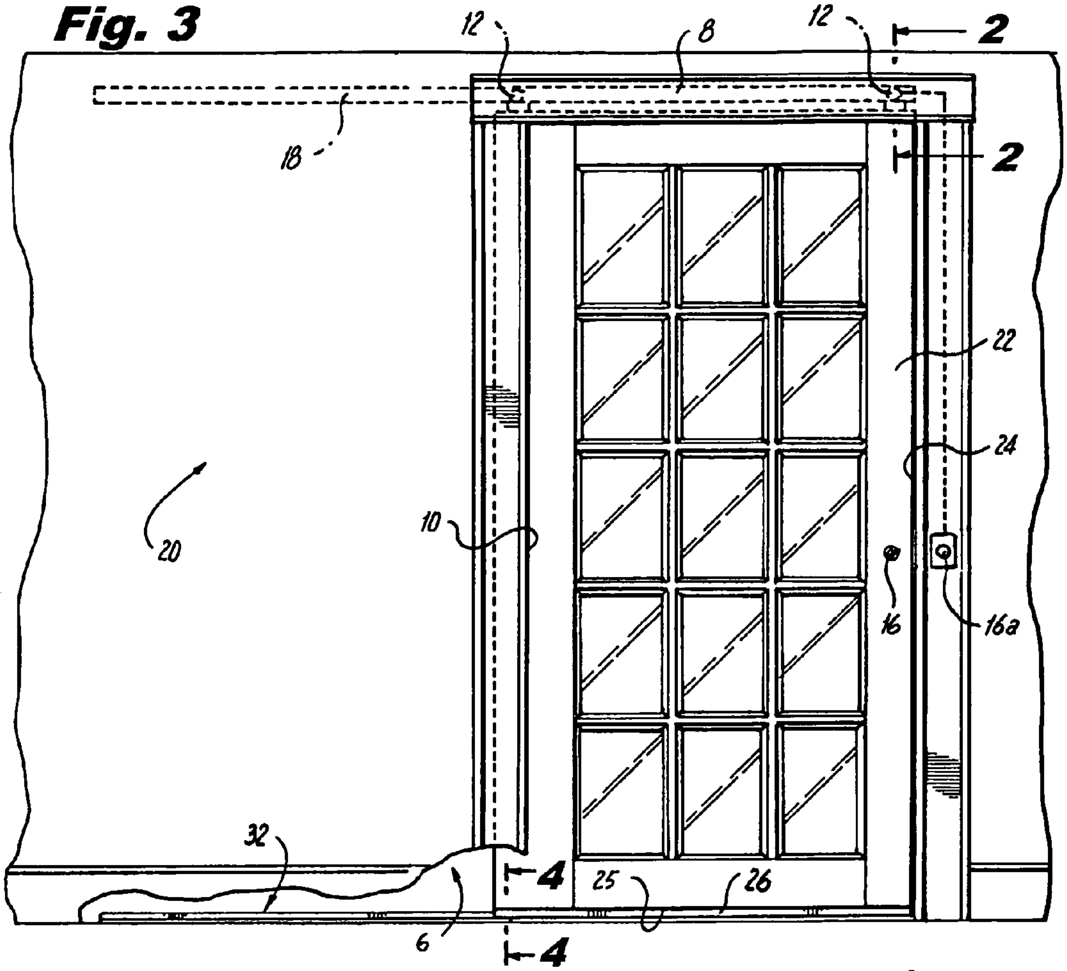
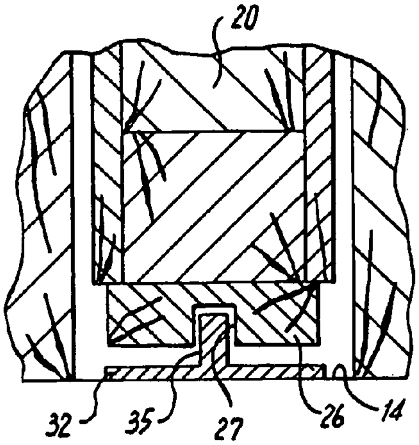
Fig. 4
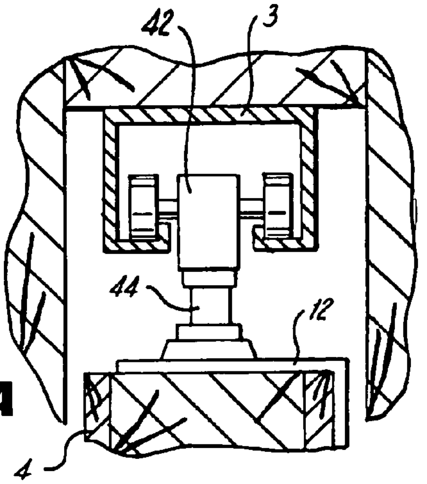
Fig. 4A

SLIDING POCKET DOOR SYSTEM

BACKGROUND OF THE INVENTION

The present invention broadly relates to pocket doors and, more particularly relates to a pocket sliding door that includes a groove in the bottom edge adapted to engage a tongue extending from a track constructed into a floor hidden within a wall, or pocket to stably maintain the door on the track during intended operation.

Pocket doors are known in the conventional arts. Pocket doors are doors that slide into and out of a hollow cavity, or pocket, in a doorway wall. To open a doorway, egress through which is maintained by a pocket door system, the closed pocket door is slid into and disappears inside the space or pocket in the wall. To close, or prevent egress through a pocket doorway opening, the pocket door is slid from its hidden (open-door) position within the pocket. Pockets doors were popular in the late eighteenth and nineteenth centuries as space savers in Victorian style homes, but appear to have fallen out of regular use in most of the twentieth century.

Conventional pocket doors typically ride on a fixed ceiling track mounted at the top of an opening into a room or closet, egress to which the pocket door is meant to maintain. The fixed ceiling track extends contiguously into the pocket. The pocket door includes a mechanism that engages with and cooperates with the fixed ceiling track, allowing the pocket door to slide in and out of the opening thereupon. One of the desirable features of conventional pocket door systems is that they avoid having a track or sliding mechanism at the floor, such as is required with conventional patio doors. Floor tracks are aesthetically undesirable in an interior setting, for example, at the doorway or egress into a dining room, library, etc. More importantly, however, floor tracks that are readily mounted upon a floor are likely to cause tripping and injury resulting therefore, particularly with children and older people.

Prior art FIGS. 1 and 2 together depict a conventional pocket door system (1), and its limitations. Conventional pocket door system (2) includes a pocket door (4) adapted for sliding into and out of an enclosed wall or pocket (6) to enable or prevent egress through a framed door opening. The framed door opening comprises top frame (8) and pocket side boundary (10). The pocket door (4) includes a roller mechanism (12) mounted at a top door surface (3), which is received into and cooperates with an upper track (18) to allow the door to slide into and out of the pocket. A door knob or handle (16) is used to open and close the pocket door, i.e., enabling it to slide open and closed.

As can be seen in FIGS. 1 and 2, conventional pocket door system (2) includes no bottom track on floor 14 for guiding the door into and out of the pocket. This lack of control at the pocket door bottom leads to problems. That is, a known shortcoming of conventional pocket doors derives from the fact that they only engage the fixed ceiling track with some type of engaging roller mechanism that facilitates sliding. The fixed ceiling track must absorb any forces exerted by the weight of the door and by the opening and closing forces exerted by a hand of a user or by an electromechanical driving means adapted to automatically slide the door between open and closed positions. As a consequence, the roller mechanisms and fixed ceiling tracks of conventional pocket doors are known to squeak, creak, grind, and/or fall off of the track.

The most significant problem by far with conventional pocket doors, however, is their tendency to be unstable at the bottom due to the lack of a floor track. This instability causes to the pocket door being frequently jammed or dislodged from its fixed ceiling track. And while dislodging and jamming is a problem where a pocket door is closed, i.e., extending out of the pocket and at least partly accessible, the problem becomes more acute where the pocket door is dislodged or jammed in the pocket or wall, and not readily accessible. Additionally, where bottom rollers are utilized, the rollers have complicated moving parts which may be subject to breakage and difficult to replace.

SUMMARY OF THE INVENTION

The present invention provides at pocket door system that overcomes the known shortcomings of conventional pocket door systems and designs.

In one embodiment, the invention provides a pocket door system that includes not only a fixed ceiling track, but a hidden bottom track having a vertically extending flat, planar protruding plate engaging a vertically extending flat, planar groove in the bottom of the pocket door, that cooperates with the top track to form a stable rail system unlikely to jam or dislodge in any open, closed, or transition positions.

The novel and non-obvious pocket door system comprises a pocket door adapted for sliding into and out of an enclosed wall or pocket to enable or prevent egress through a framed door opening. The pocket door includes a roller mechanism mounted at a top door surface and a guide mechanism including a receiving slot that is mounted at a bottom door surface. A floor track is adapted for mounting upon a floor surface secluded within the enclosed wall or pocket that includes a vertically extending, flat, planar protruding element plate for insertion into the receiving slot of said guide mechanism An upper track comprising structure for engaging the roller mechanism and which is adapted for mounting upon a ceiling portion that extends contiguously though both the framed door opening and the enclosed wall or pocket. The pocket door system is constructed so that the roller mechanism engages the upper track as the receiving slot of the guide mechanism receives the protruding element in order to compel the pocket door to slide into and out of the enclosed wall or pocket without wobbling and dislocation from the upper and floor tracks during intended operation.

The pocket door includes that the floor track may comprise a T-shaped bracket or an L-shaped bracket, wherein the vertically extending flat, planar protruding plate element extends upward from a horizontal base portion and engages a corresponding vertically extending flat, planar recess slot in the bottom of the door. The floor track does not extend out from the enclosed wall or pocket into the framed door opening, but preferably has a length that is longer than a length of said guide mechanism. The floor track protruding portion is not required to extend the length of the floor track, and may be comprise discontiguous sections along its entire length. The floor track may comprise metal such as aluminum, or may comprise one of nylon and hardened polypropylene. The mechanism may include a ball bearing-based structure for near frictionless sliding along the top track.

Preferably, the guide mechanism forms a frictionless coupling with the floor track, but may also be constructed so that it evenly distributes a portion of a weight of said pocket door upon said protruding member of said floor track. The guide mechanism may comprise metal, such as aluminum, but may also comprise one of nylon and hardened polypropylene. In the preferred form, the pocket door system roller mechanism, upper track, guide mechanism and floor track cooperate as a constant rail system.

BRIEF DESCRIPTION OF THE DRAWING FIGURES

Aspects of the invention will become apparent upon reading the following detailed description and upon reference to the accompanying drawings in which, like references may indicate similar elements:

Prior art FIG. 1 is a schematic diagram illustrative of a conventional pocket door system;

FIG. 3 is a schematic block diagram illustrative of a pocket door system of the invention;

FIG. 4 is a side cross-sectional view of a lower portion of the pocket door system of FIG. 1;

FIG. 4A is a side cross-sectional view of an upper portion of the pocket door system of FIG. 1;

DETAILED DESCRIPTION OF THE INVENTION

Figure 1:
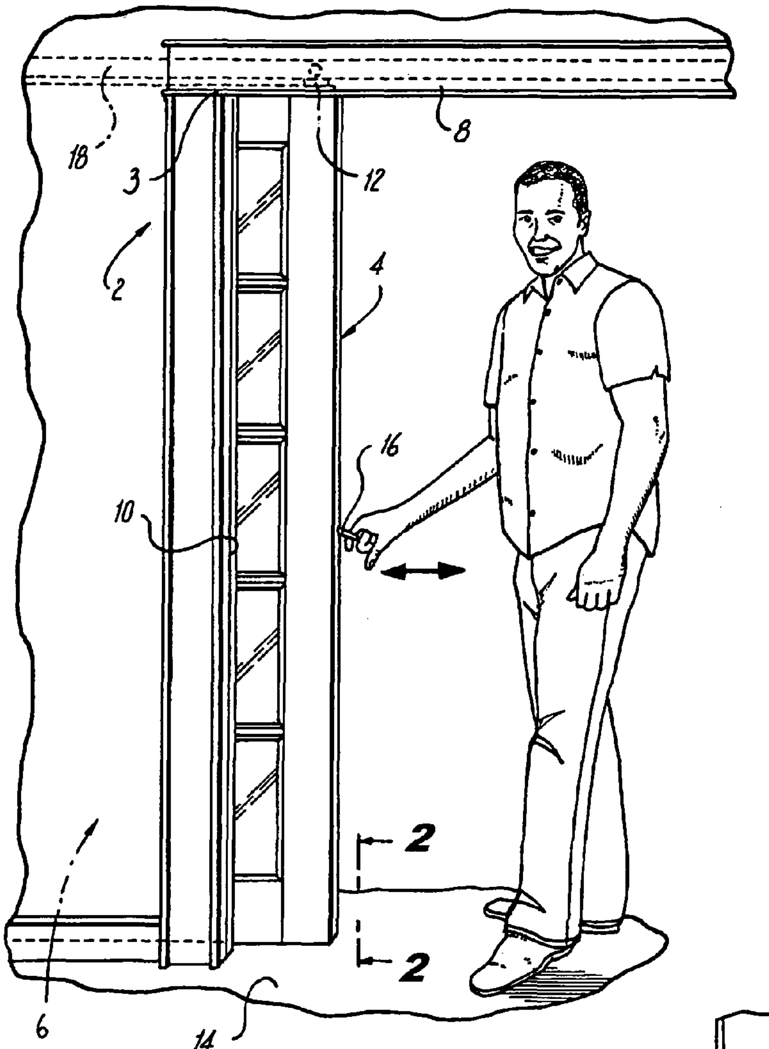
Fig. 1 (Prior Art)
Figure 2:
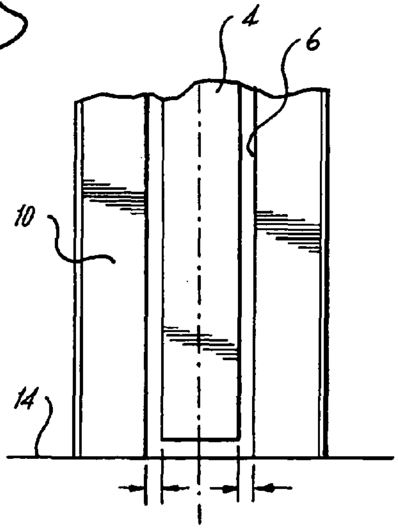
Fig. 2 (Prior Art)
FIG. 2 is a side cross-sectional view of a lower portion of the conventional pocket door system of FIG. 1.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention, as defined by the appended claims. The descriptions below are designed to make such embodiments obvious to a person of ordinary skill in the art.

Turning now to FIGS. 3, 4 and 4A, a pocket door system (20) is shown to include a pocket door (22) adapted for sliding into and out of an enclosed wall or pocket (6) to enable or prevent egress through a framed door opening. The framed door opening comprises top frame (8), pocket side boundary (10), jamb side boundary (24) and floor boundary (25). The pocket door system (20) includes a roller mechanism (12) mounted at a top door surface and a guide mechanism (26) mounted at a bottom door surface that includes a slot (27). A door knob or handle (16) is used to open and close the door, i.e., allows it to slide open and closed. While the pocket door can be manually operated by pulling handle (16), in an alternative embodiment the pocket door system may include a switch and drive mechanism (16*a*) for automatically opening and closing the pocket door upon switch actuation, wherein the drive is electrical.

A floor track (32) adapted for mounting upon a floor surface (14) secluded within the enclosed wall or pocket (6) is shown to include a protruding element (35) for insertion into the slot (27) of said guide mechanism (26). Upper track (18), which comprises means (42) for engaging with an arm connector (44) of the roller mechanism (12), is adapted for mounting upon a ceiling portion that extends contiguously though both the top framed door opening (8) and an upper portion of the enclosed wall or pocket (6). The pocket door system (20) is constructed so that the roller mechanism (12) and arm connector (44) engage the upper track (18) as the guide mechanism (26) engages with the protruding element (35) of the floor track (32) in order to compel the pocket door (22) to slide into and out of the enclosed wall or pocket (6) without wobbling and dislocation from the upper track (18) and floor track (32). Guide mechanism (26) is typically less wide than door (20). For example, where a typical door is 1⅜ inches in width, the guide mechanism (26) is typically about one inch in width, although these dimensions may vary in other embodiments.

Figure 5:
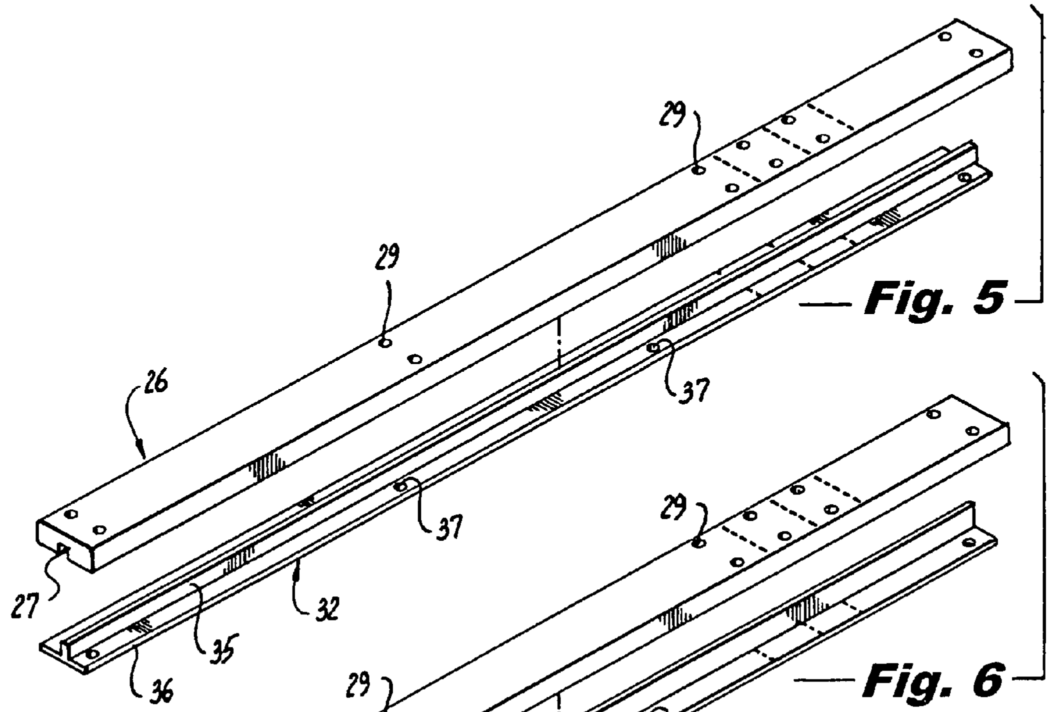
FIG. 5 is a perspective view of one embodiment of a floor track and guide mechanism of the invention.
Figure 6:
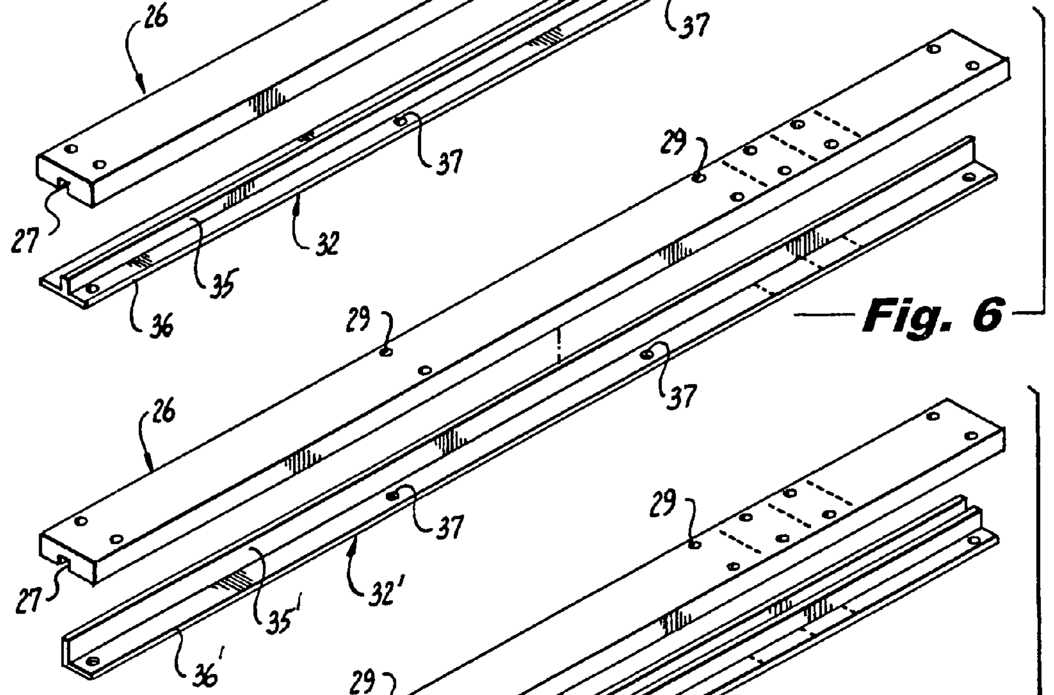
FIG. 6 is a perspective view of one embodiment of a floor track and guide mechanism of the invention.

FIG. 5 highlights the floor track (32), and vertically extending, flat, planar protruding member (35), arranged in a form of a T-shaped bracket, wherein said flat, planar protruding element extends upward from a horizontal base portion. The vertically extending, flat, planar protruding member (35) of the T-shaped floor bracket (32) is constructed to extend perpendicularly from a flat, planar bracket base (36), which base is mounted to the floor with fasteners through mounting holes (37). Alternatively, as shown in FIG. 6, the floor track may comprise an L-shaped bracket (32'), wherein said flat, planar protruding element extends upward from a horizontal base portion. The protruding member (35') of the L-shaped floor bracket (32') is constructed to extend perpendicularly from a flat, planar bracket base (36'), which is mounted to the floor with fasteners through mounting holes (37).

The floor tracks (32; 32') do not extend out from the enclosed wall or pocket into the framed door opening, for both aesthetic and safety reasons. The floor tracks length may vary considerably, as long as they are of sufficient length to stably maintain the door in its extended (closed) and hidden (open) positions. For example, the floor tracks may have a length of that is longer than a length of the guide mechanism (26), much less that the length of the guide mechanism, or even be constructed on two or more protruding points or short length protruding members, i.e., wherein the floor track protruding portion comprises discontiguous sections along the length of said floor track.

The floor track may comprises metal, such as aluminum, cast steel, stainless steel, brass or metal alloys, or may comprises hard synthetic material, such as nylon or hardened polypropylene. For that matter, the roller mechanism (12) and connecting arm (44) are presented for exemplary purposes only, and not meant to limit the invention in any way to a particular upper door sliding/rolling mechanism to enable the pocket door of the invention to move into and out of the pocket.

Figure 7:
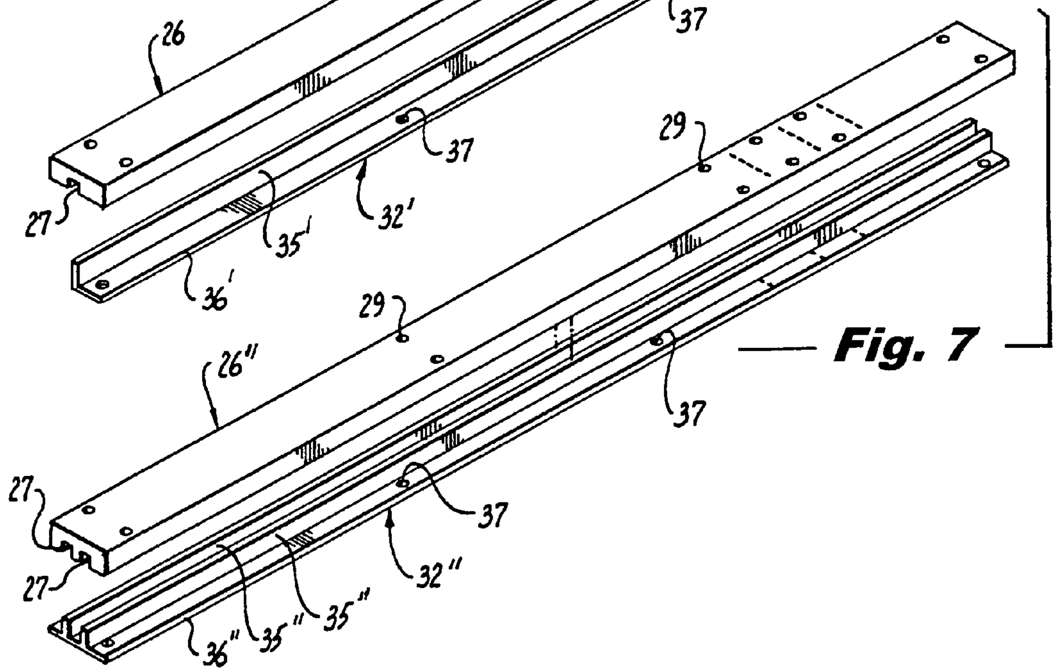
FIG. 7 is a perspective view of one embodiment of a floor track and guide mechanism of the invention.

An alternative guide mechanism (26") is shown in FIG. 7, which cooperates with a U-shaped bracket (32"). The vertically extending, flat, planar protruding members (35") of the U-shaped floor bracket (32") are constructed to extend perpendicularly from a flat, planar bracket base (36"), which is mounted to the floor with fasteners through mounting holes (37). Like bracket (32; 32'), U-shaped floor bracket (32") includes mounting holes (29).

The guide mechanisms (26; 26'; 26") that are shown in FIGS. 5, 6 and 7 include holes (29) through which fasteners are used to affix the guide mechanism to the bottom of pocket door (22). The guide mechanisms may come in various sizes to accommodate the various sizes generally used for construction in the US, i.e., 18 inches, 24 inches, 28 inches, 30 inches, 36 inches, 48 inches, etc., or any custom size in that range. That is, the invention is not limited to any specific size, but may readily be adjusted in size for any pocket door application.

Preferably, the guide mechanism (26; 26'; 26") forms a frictionless coupling with the floor tracks (32; 32'; 32"). The guide mechanisms evenly distribute a portion of a weight of the pocket door (22) upon the protruding members (35; 35'; 35") of the floor tracks (32; 32'; 32"). The guide mechanisms may comprise metal, such as aluminum, cast steel, stainless steel, brass or metal alloys, or may comprises hard synthetic material, such as nylon or hardened polypropylene.

Although examples of the present invention have been shown and described, it would be appreciated by those skilled in the art that changes may be made in these embodiments without departing from the principles and spirit of the invention, the scope of which is defined in the following claims and their equivalents.

What is claimed is:

1. A pocket door system consisting of:

a single pocket door adapted for sliding into and out of an enclosed vertically extending wall or pocket to enable and prevent egress through a framed door opening, said single pocket door having a pair of opposite vertically extending side door surfaces and a flat horizontally extending bottom door surface; said single pocket door including a roller mechanism mounted at a top door surface and a lower guide mechanism consisting of a receiving slot that is mounted and extending only upward into said door, above said flat horizontally extending bottom door surface and being centrally located only at said flat horizontally extending bottom door surface, said single pocket door completing covering said framed door opening when fully extended from said pocket;

said enclosed vertically extending wall having a side boundary on each side of said pocket;

said pocket door system further consisting of a floor track having no moving parts and said floor track mounted only upon a floor surface entirely secluded within the enclosed wall or pocket, said pocket door system further consisting of a flat, planar vertically protruding element extending up vertically from said floor track; said floor track and said centrally located flat, planar vertically protruding element being located only within the enclosed wall or pocket, for insertion into the flat, planar centrally located vertically extending receiving slot of said horizontally extending bottom door surface, said pocket door system further consisting of said floor track not extending out from the enclosed wall or pocket into the framed opening for improved safety;

said pocket door system further consisting of said floor track not being attached to said respective side boundaries on each side of said pocket;

said single pocket door further consisting of respective left and right vertically extending side surfaces, said bottom surface of said horizontally extending bottom door surface being separated from a floor of said frame opening by an uninterrupted gap therebetween;

said pocket door system further consisting of said centrally located floor track not being attached to said respective vertically extending left and right side surfaces of said single pocket door, and an upper track and said roller mechanism comprising a connecting arm extending from a top of said door, a pair of rollers extending from said connecting arm, and said rollers riding in tracks formed in an extended member mounted on a ceiling portion that extends contiguously through at least a portion of both the framed door opening and the enclosed wall or pocket;

wherein the pocket door system is constructed so that the roller mechanism engages the upper track as the flat, planar centrally located vertically extending receiving slot of the guide mechanism receives the flat planar centrally located vertically protruding element only within the enclosed wall or pocket in order to compel said single pocket door to slide into and out of the enclosed wall or pocket without wobbling and dislocation from the upper and floor tracks during intended operation.

2. The pocket door system as set forth in claim 1, wherein said floor track comprises an inverted T-shaped bracket, wherein said flat, planar protruding element comprises a single layer or integral member which extends upward from a horizontal base portion.

3. The pocket door system as set forth in claim 1, wherein said floor track comprises an L-shaped bracket, wherein said flat, planar protruding element comprises a single layer or integral member which extends upward from a horizontal base portion.

4. The pocket door system as set forth in claim 3, wherein said floor track has a length that is longer or shorter than a length of said guide mechanism.

5. The pocket door system as set forth in claim 3, wherein said floor track flat, planar protruding portion does not extend the length of said floor track.

6. The pocket door system as set forth in claim 3, wherein said floor track flat planar protruding portion comprises discontiguous sections along the length of said floor track.

7. The pocket door system as set forth in claim 1, wherein said floor track comprises metal.

8. The pocket door system as set forth in claim 7, wherein said floor track comprises aluminum.

9. The pocket door system as set forth in claim 1, wherein said floor track comprises one of nylon or hardened polypropylene.

10. The pocket door system as set forth in claim 1, wherein said guide mechanism forms a frictionless coupling with said floor track.

11. The pocket door system as set forth in claim 1, wherein said guide mechanism comprises metal.

12. The pocket door system as set forth in claim 11, wherein said guide mechanism comprises aluminum.

13. The pocket door system as set forth in claim 1, wherein said guide mechanism comprises one of nylon or hardened polypropylene.

14. The pocket door system as set forth in claim 1, wherein the roller mechanism, upper track, guide mechanism and floor track cooperate as a constant rail system.

15. The pocket door system as set forth in claim 1, wherein said floor track comprises a U-shaped bracket, and said guide mechanism is configured with slots for receiving members protruding from said U-shaped bracket.

16. The pocket door system as set forth in claim 1, wherein the upper track extends contiguously through both the framed door opening and the enclosed wall or pocket.

17. The pocket door system as set forth in claim 1, wherein said bottom surface of said door includes an upwardly extending recess having an inlay combined therein, said inlay extending only upward into said upwardly extending recess of said bottom surface of said door, said inlay having said centrally located vertically extending receiving slot.

* * * * *